US006529495B1

(12) United States Patent
Aazhang et al.

(10) Patent No.: US 6,529,495 B1
(45) Date of Patent: Mar. 4, 2003

(54) METHOD AND APPARATUS FOR PROVIDING DIFFERENCING MULTISTAGE DETECTION IN THE REVERSE LINK OF A CODE DIVISION MULTIPLE ACCESS COMMUNICATION SYSTEM

(75) Inventors: Behnaam Aazhang, Houston, TX (US); Joseph R. Cavallaro, Pearland, TX (US); Gang Xu, Houston, TX (US)

(73) Assignee: Nokia Telecommunications, Oy (FI)

( * ) Notice: Subject to any disclaimer, the term of this patent is extended or adjusted under 35 U.S.C. 154(b) by 0 days.

(21) Appl. No.: 09/317,333

(22) Filed: May 24, 1999

(51) Int. Cl.⁷ .................. H04B 7/216; H04B 1/69; H04B 1/707; H04B 1/713

(52) U.S. Cl. .................. 370/342; 375/148; 375/150

(58) Field of Search .................. 370/335, 342, 370/252; 375/144, 148, 285, 254, 346, 348, 349; 455/67.1, 423, 424, 67.3, 561

(56) References Cited

U.S. PATENT DOCUMENTS

| | | | |
|---|---|---|---|
| 5,644,592 A | | 7/1997 | Divsalar et al. |
| 5,663,983 A | | 9/1997 | Lin |
| 5,757,791 A | * | 5/1998 | Kanterakis et al. .......... 370/342 |
| 5,933,423 A | * | 8/1999 | Laakso et al. ............... 370/335 |
| 6,137,788 A | * | 10/2000 | Sawahashi et al. .......... 370/342 |

FOREIGN PATENT DOCUMENTS

EP  0 776 105 A1  5/1997

OTHER PUBLICATIONS

S. Verdu, Minimum Probability of Error for Asynchronous Gaussian Multiple–Access Channels, IEEE Transactions on Information Theory, vol. IT 32, Jan. 1986, pp. 85–96.

Duel–Hallen, A., "A Family of Multiuser Decision—Feedback Detectors for Asynchronous Code—Division Multiple—Access Channels", *IEEE Transactions on Communications*, vol. 43, No. 2/3/4, pp. 421–434 (Feb./Mar./Apr. 1995).

Hinderling, J. et al., "CDMA Mobile Station Modem ASIC", *IEEE Journal of Solid–State Circuits*, vol. 28, No. 3, pp. 253–260 (Mar. 1993).

Kang, I. et al., "Low–Power Viterbi Decoder for CDMA Mobile Terminals", *IEEE Journal of Solid–State Circuits*, vol. 33, No. 3, pp. 473–482 (Mar. 1998).

Liu, K. et al., "A Pipelined Digital Differential Matched Filter FPGA Implementation & VLSI Design", *IEEE 1996 Custom Integrated Circuits Conference*, pp. 75–78 (May 1996).

(List continued on next page.)

Primary Examiner—Wellington Chin
Assistant Examiner—William Schultz
(74) Attorney, Agent, or Firm—Altera Law Group LLC

(57) ABSTRACT

A multistage detector is disclosed that maximizes computation power while minimizing system delay. The differencing multistage detector receives signals from a plurality of users in a cell of a communications system and reduces the effect of multiple access interference to a signal from a desired user caused by interference from other users in the cell. The differencing multistage detector includes a plurality of stages, each stage including an interference canceller for removing intra-cell interference caused by the other users in the cell and producing an estimation output vector, wherein except for a first stage, the estimation output vector of a current stage is based on both a decision of the interference canceller of the current stage and the output from an interference canceller of a previous stage. The estimation output vector of a current stage is produced by combining the output from an interference canceller of a previous stage and the decision of the interference canceller of the current stage. Except for the first stage each interference canceller calculates an estimate of multi-user interference by computing a product of a cross-correlation of the received signals and a difference signal thereby reducing the number of multiplication operations required.

31 Claims, 8 Drawing Sheets

OTHER PUBLICATIONS

Varanasi, M. et al., "Multistage Detection in Asynchronous Code—Division Multiple—Access Communications", *IEEE Transactions on Communications,* vol. 38, No. 4, pp. 509–519 (Apr. 1990).

Bar–ness, Y. et. al., *Adaptive Bootstrap CDMA Multi–User Detector,* Wireless Personal Communications, NL, Kluwer Academic Publishers, vol. 3 No. 1/02, 1996, pp. 55–71.

* cited by examiner

METHOD AND APPARATUS FOR PROVIDING DIFFERENCING MULTISTAGE DETECTION IN THE REVERSE LINK OF A CODE DIVISION MULTIPLE ACCESS COMMUNICATION SYSTEM

BACKGROUND OF THE INVENTION

1. Field of the Invention

This invention relates in general to a multistage detector in wireless communication systems, and more particularly to a method and apparatus for providing differencing multistage detection in the reverse link of a Code Division Multiple Access communication system.

2. Description of Related Art

Cellular systems have had a direct effect on the lives of millions over the past few years. For the first time, people are able to make and receive phone calls without being tied to a specific location. Mobile phones, as part of the cellular systems, have allowed people to break the tie between location and access to communication. Mobile phones have also allowed people to reach another who is in move. With the development in cellular systems, people are allowed to reach another who is mobile in anywhere at anytime.

The first generation of mobile communication systems were born in the early 1980s. The marriage of radio and telephone technologies gave birth to mobile phones and triggered a turning point in telecommunications. Adding radio access to a telephone network meant that for the first time in history, the concept of a telephone being at a fixed point in the network was no longer valid. The benefits of being able to make and receive telephone calls anywhere had appeal to business people—the original market. In the first generation of cellular networks, analog wireless technology were used for the user connection (called the "air interface"). Every voice channel had its own narrow frequency band, using a technology called Frequency Division Multiple Access (FDMA).

However, as the demand for mobile phones grew and grew, regularly exceeding forecasts, it became obvious that the available radio spectrum would not be adequate to accommodate the expected numbers of mobile phone users. The digital technology became the solution to the problem. The answer lay in new digital wireless technologies that allow larger numbers of mobile subscribers to be supported within a given frequency allocation. Time Division Multiple Access (TDMA) technology is used in which a broader frequency channel is divided into intermittent time-slots, i.e. several calls share the same frequency channel at any one time. The digital technology also offered other important benefits. It provided better voice quality and improved security against unauthorized eavesdropping. Another technology, Code Division Multiple Access (CDMA) has also been developed subsequently to increase capacity.

The first and second generation mobile communication systems were mainly set to support voice communications, although today's mobile phones can also be used for data transfer at rates that are acceptable for relatively low-speed data applications such as sending and receiving of faxes and e-mail. However, these systems do not support high-speed data or video applications. The third generation mobile communication system is being developed to remove the bandwidth bottleneck and support a whole new range of voice, data, video, and multimedia services. For example, smart messaging is bringing Internet services to every mobile user's fingertips. As people become used to the freedom that mobile communications have provided, they will become more demanding about the information and services required to benefit their lives.

The demand by consumers all over the world for mobile communications service continues to expand at a rapid pace and will continue to do so for at least the next decade. To satisfy such demand, more and more innovative mobile telecommunications networks are being built in this growing industry.

Code Division Multiple Access (CDMA) is emerging as one of the main technologies for the implementation of third-generation (3G) cellular systems. In CDMA, each user is assigned a unique code sequence (spreading code) that is used to encode an information bearing signal. The receiver, knowing the code sequences of the user, decodes a received signal after reception and recovers the original data. This is possible since the cross-correlations between the code of the desired user and the codes of the other users are small. Since the bandwidth of the code signal is chosen to be much larger than the bandwidth of the information-bearing signal, the encoding process spreads the spectrum of the signal and is therefore also know as spread-spectrum modulation.

CDMA may be classified according to the modulation techniques. For example, the system may a direct sequence (DS) spread-spectrum CDMA system wherein the information bearing signal is multiplied directly by a high chip rate spreading code. Another modulation technique is frequency hopping spread-spectrum wherein the carrier frequency at which the information-bearing signal is transmitted is rapidly changed according to the spreading code. Time hopping spread-spectrum involves transmitting the information-bearing signal in short bursts rather than continuously wherein the timing of the short bursts are decided by the spreading code. Hybrid modulation is also possible where two or more of the above-mentioned modulation techniques are used. Moreover, it is possible to combine CDMA with other multiple access methods: TDMA, multicarrier (MC) or multitone (MT) modulation.

In DS-CDMA, the modulated information-bearing signal (the data signal) is directly modulated by a digital, discrete time, discrete valued code signal. The data signal may be either an analog signal or a digital one. Typically it is a digital signal. For a digital signal, the data modulation is often omitted and the data signal is directly multiplied by the code signal and the resulting signal modulates a wideband carrier. CDMA system often use a hybrid diversity scheme to capture both strong and weak signals in the same cellular region. To capture both the strong and weak signals in the same cellular region antenna-array diversity and RAKE diversity are implemented. Further, RAKE receivers for both the mobile and base stations are specified to improve reception in the cases where the delay spreads are significant.

Current CDMA receivers are based on the RAKE receiver principle, which considers other users' signals as interference. However, in an optimum receiver al signals would be detected jointly or interference from other signals would be removed by subtracting them from the desired signal. This is possible because the correlation properties between signals are known (i.e., the interference is deterministic not random).

The capacity of a direct sequence CDMA system using RAKE receiver is interference limited. In practice this means that when a new user, or interferer, enters the network, other users service quality will degrade. The more the network can resist interference the more users can be served. Multiple access interference that disturbs a base or mobile station is a sum of both intra- and intercell interference.

Multiuser detection (MUD), also called joint detection and interference cancellation (IC), provides means of reducing the effect of multiple access interference, and hence increase the system capacity. In the first place, MUD is considered to cancel only the intra-cell interference, meaning that in a practical system the capacity will be limited by the efficiently of the algorithm and the intercell interference.

In addition to capacity improvement, MUD alleviates the near/far problem typical to DS-CDMA systems. A mobile station close to a base station may block the whole cell traffic by using too high a transmission power. If this user is detected first and subtracted from the input signal, the other users do not see the interference.

The conventional matched filter bank method in a multiuser detector experiences MAI (Multiple Access Interference) and the near-far problem. Optimal multiuser detector that have been proposed can eliminate the MAI and offer a significant improvement over the conventional multiuser detector. However, for a K-user, N-bit communication system, it requires $2^{NK}$ times exhaustive searches to find a maximum likelihood sequence, which is computational intensive. This has lead researchers to use sub-optimum multiuser detectors, such as decorrelating detectors and minimum mean-squared error (MMSE) detectors, which require the calculation of the inverse of the cross-correlation matrix or the matrix which has the same scale.

The other group of multiuser detectors is based upon interference cancellation (IC). The idea is to subtract the interference generated by users other than the desired user. Lower computation demanding and hardware related structures are the major advantages of this strategy. One of the most effective IC is the parallel interference cancellation (PIC) which comes from the iterative multistage method, which was first proposed by M. K. Varanasi and B. Aazhang, in "Multistage Detection in Asynchronous Code Division Multiple Access Communications", IEEE Transactions in Communications, Vol. 33, NO. 4: 509–519, Apr. 1990.

The inputs of one particular stage are the estimated solution of previous stage. After interference cancellation, the new estimations, which should be closer to the transmitted bits, come out to be fed into the next stage. Almost all existing multistage based algorithms neglect the fact that as the iterations progress, the solution becomes more and more invariant, i.e. more and more elements in the output vector turn out to be the same as the elements in the input vector. Ideally at the last iteration stage, the output and the input should be identical if the algorithm converges. Therefore in last several stages, the multistage detector will almost calculate from the same input to get the same result. This is a substantial waste of the computation power and it increases the system delay.

It can be seen that there is a need for a multistage detector that maximizes computation power while minimizing system delay.

It can also be seen that there is a need for a method and apparatus for providing differencing multistage detection in the reverse link of a Code Division Multiple Access communication system.

SUMMARY OF THE INVENTION

To overcome the limitations in the prior art described above, and to overcome other limitations that will become apparent upon reading and understanding the present specification, the present invention discloses an improved multistage detector in wireless communication systems.

The present invention solves the above-described problems by providing a multistage detector that maximizes computation power while minimizing system delay. The differencing multistage detector achieves both high performance in the interference cancellation and computational efficiency, which leads to a very large scale integrated circuit (VLSI) implementation. When the iterative algorithm of the differencing multistage detector converges, the difference of the solution vectors between two consecutive stages is mostly zero.

A system in accordance with the principles of the present invention includes a differencing multistage detector for receiving signals from a plurality of users in a cell of a communications system, the differencing multistage detector reducing the effect of multiple access interference to a signal from a desired user caused by interference from other users in the cell, wherein the differencing multistage detector includes a plurality of stages, each stage including an interference canceller for removing intra-cell interference caused by the other users in the cell and producing an estimation output vector, wherein except for a first stage, the estimation output vector of a current stage is based on both a decision of the interference canceller of the current stage and the output from an interference canceller of a previous stage.

Other embodiments of a system in accordance with the principles of the invention may include alternative or optional additional aspects. One such aspect of the present invention is that the estimation output vector of a current stage is produced by subtracting the output from an interference canceller of a previous stage from the decision of the interference canceller of the current stage.

Another aspect of the present invention is that except for the first stage each interference canceller calculates an estimate of multi-user interference by computing a product of a cross-correlation of the received signals and the difference signal.

Another aspect of the present invention is that the difference signal comprises 0, +2, or −2.

Another aspect of the present invention is that the computing of the product is omitted when the difference signal is 0, and the computing of the product is performed by storing the cross-correlation of the received signals in a register and shifting the bits one place forward when the difference signal is +2 and one place forward with a sign change when the difference is −2.

Another aspect of the present invention is that the interference canceller is a parallel interference canceller.

Another aspect of the present invention is that control between stages is handled by a handshaking protocol.

Another aspect of the present invention is that the input to each stage is in two's compliment form.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a differencing multistage detector for the reverse link of wireless CDMA communication systems. The differencing multistage detector achieves both high performance in the interference cancellation and computational efficiency, which leads to a very large scale integrated circuit (VLSI) implementation. When the iterative algorithm of the differencing multistage detector converges, the difference of the solution vectors between two consecutive stages is mostly zero.

Figure 1:
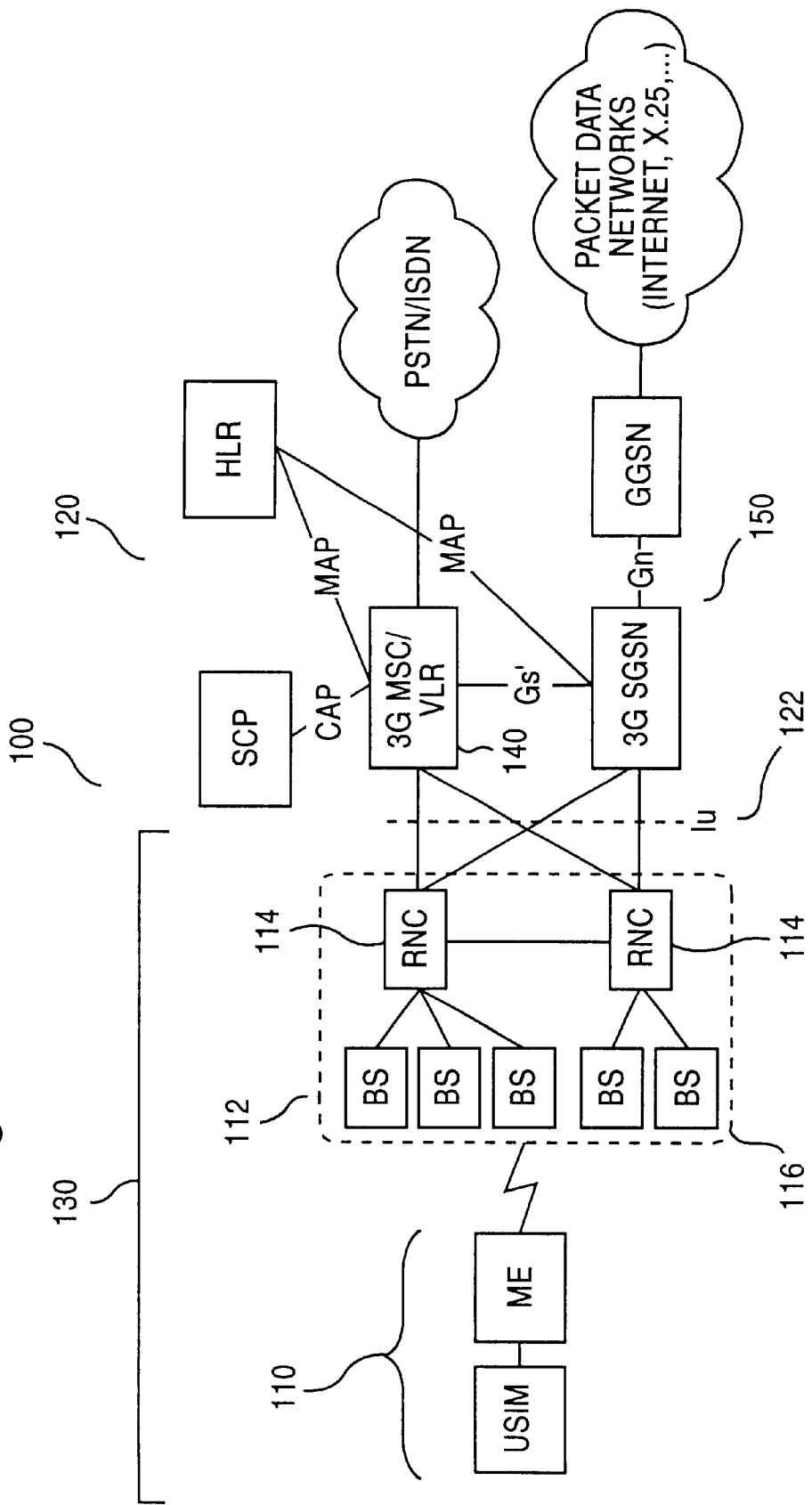
FIG. 1 illustrates one possible embodiment of an advanced communication network.

FIG. 1 illustrates one possible embodiment of an advanced communication network 100, e.g., a third generation GSM evolution. Those skilled in the art will recognize that the present invention is not meant to be limited to use with GSM mobile communication systems, but is applicable to other mobile communication systems. However, the present invention will be described herein using GSM as an example.

As shown in FIG. 1, the first implementations of Generic Radio Access Network (GRAN) may be based on the integration of RAN and SGM/UMTS core network, which has been evolved from the GSM core network by integrating new third generation capabilities. The evolved GSM network elements are referred to as 3G MSC and 3G SGSN.

A mobile unit 110 receives and sends signals to a base station (BS) 112. Base stations 112 are in turn coupled to a radio network controller (RNC) 114 in the radio access network (RAN) 116. The RAN interfaces with GSM/UMTS core network 120 via the Iu-interface 122, which corresponds to the GSM A-interface and GPRS Gb-interface. As can be seen, radio access 130 is isolated from the core network 120, and the goal is that the GSM/UMTS core network would have the flexibility to support any radio access scheme. Circuit switched services are routed via the GSM MSC 140, and the packet switched services via the GPRS part 150 of the GSM/UMTS core network.

Figure 2:
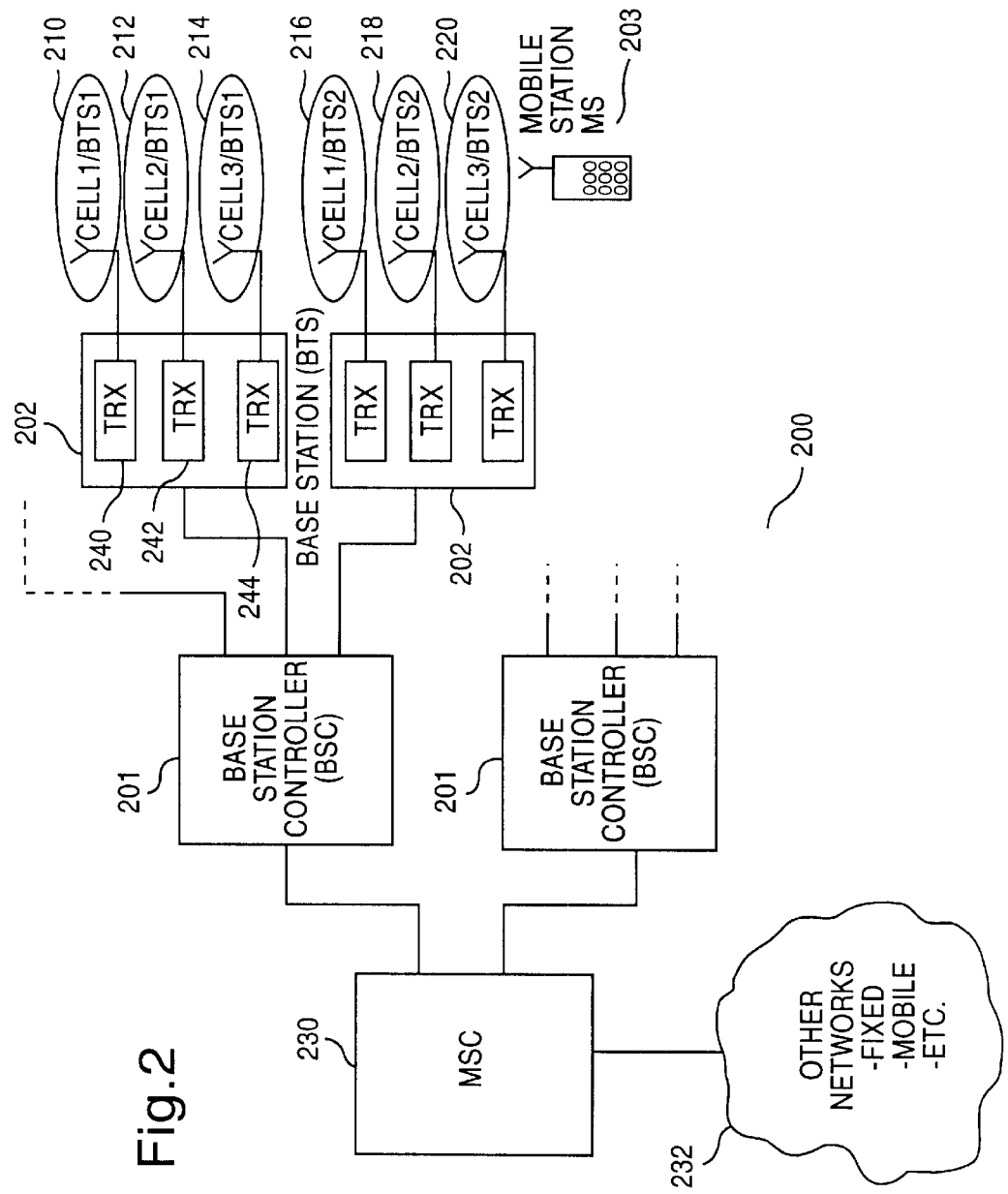
FIG. 2 illustrates a detailed block diagram of a mobile communication system illustrating the details of a base station according to an embodiment of the present invention.

FIG. 2 illustrates a detailed block diagram of a mobile communication system 200 illustrating the details of a base station according to an embodiment of the present invention. The system 200 is comprised of a plurality of base stations 202 connected to system controllers 201, and mobile terminals 203. A service area of the mobile communication system 200 is divided into a plurality of cells 210–220. The mobile switching center 230 is connected with another mobile communication system or fixed network 232 and coordinates the setting up of calls to the mobile terminals 203. The mobile terminal 203 can move within a service area which is formed by a plurality of base stations 202 for communication through a channel allocated to the neighboring base station 202.

The base station 202 includes transceivers 240, 242, 244. The transceivers 240, 242, 244, which represent at least one receiver and one transmitter, provide coverage to cells 210, 212, 214 respectively, wherein each transmitter/receiver pair 240, 242, 244 comprises a channel unit. The transceivers 240, 242, 244 also receive calling signals sent from the mobile terminal 203 moving in the corresponding cell, and detect up-link carrier wave power of the received signal.

Figure 3:
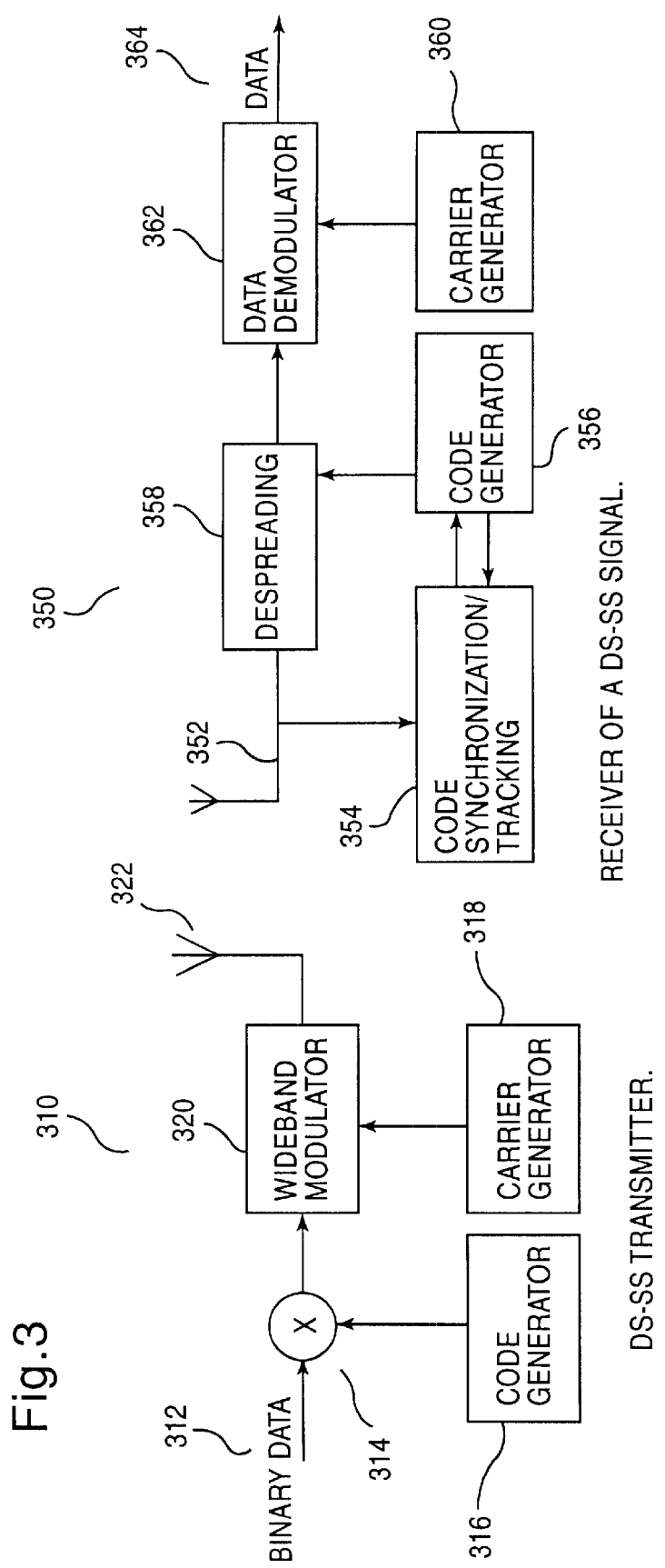
FIG. 3 illustrates a direct sequence spread spectrum transmitter and a direct sequence spread spectrum receiver according to the present invention.

FIG. 3 illustrates a direct sequence spread spectrum transmitter 310 and a direct sequence spread spectrum receiver 350 according to the present invention. In the transmitter 310, binary data 312 is multiplied 314 by a spreading code generated by the code generator 316. The coded signal 317 is modulated onto a carrier generated by the carrier generator 318 at the wideband modulator 320. The spread spectrum signal 322 is then transmitted.

At the receiver 350, a spread spectrum signal 352 is received. The received signal 352 is used to synchronize the code used for despreading the received spread spectrum signal 322 with the received spread spectrum signal 322 at the code synchronization/tracking block 354. The code generator 356 generates the code used for despreading the received spread spectrum signal 322. The despread signal is then demodulated at the date demodulator 362 using a carrier generated by the carrier generator 360 to reproduce the data signal 364.

Figure 4:
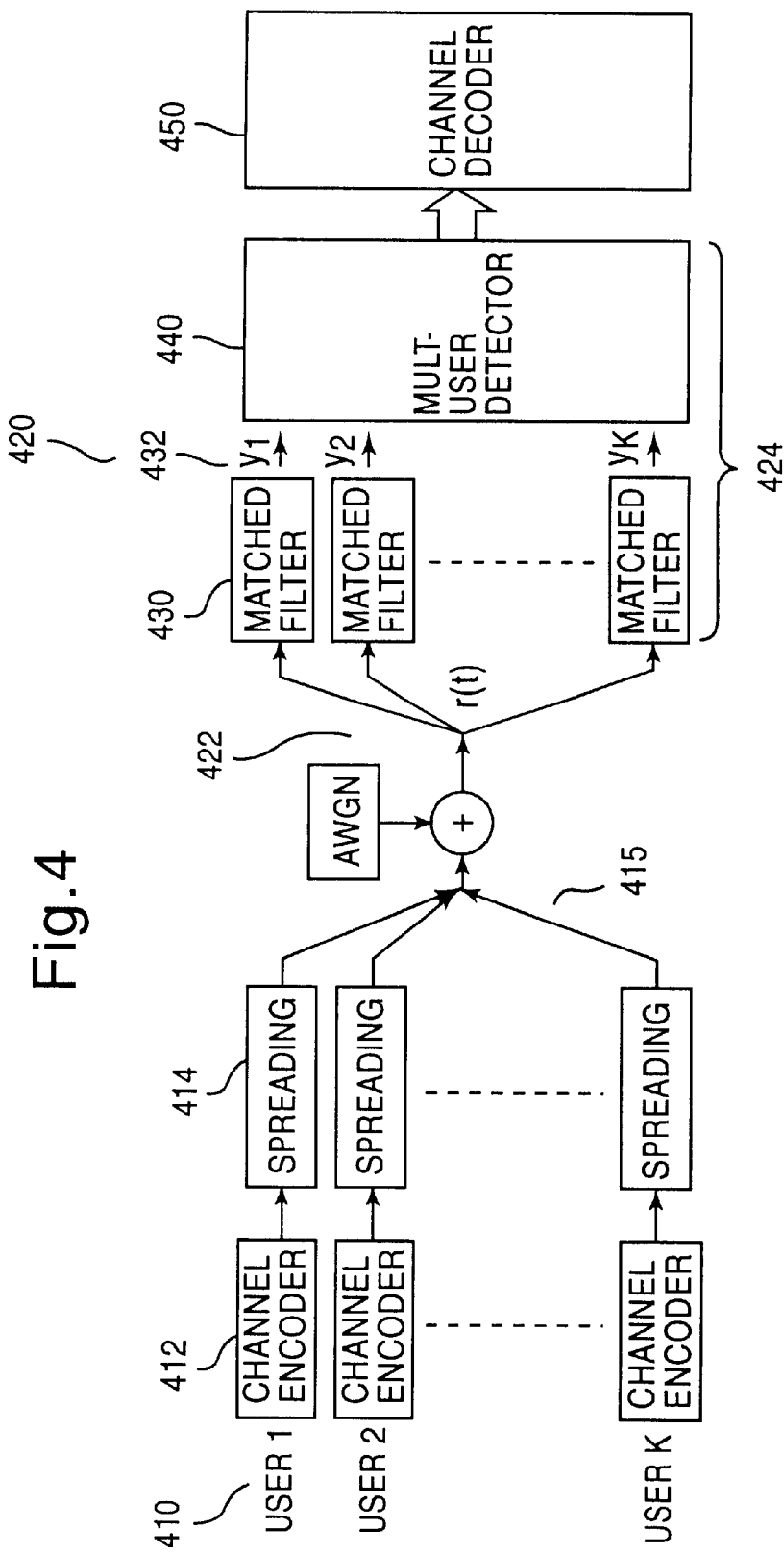
FIG. 4 shows a model system of a multiuser communication system according to the present invention.

Assuming that the modulator uses a K-user binary phase-shift keying (BPSK) technique for the modulated DS-CDMA communications system, the channel is a single path channel with additive white Gaussian noise (AWGN). FIG. 4 shows a model system of a multiuser communication system according to the present invention.

To simplify the explanation of the invention, the description of the invention will be limited to a synchronized scenario. However, those skilled in the art will readily recognize that the asynchronous scenario can be derived by simply adding the delay information to each user.

In FIG. 4, each user signal 410 is encoded through a channel encoder 412. The signal from the channel encoder is spread at the spreading block 414. These signals 415 are transmitted over a channel 416 that includes, additive white Gaussian noise (AWGN) 418. In the receiver 420, the received signal 422 is correlated with replicas of the user spreading codes. The received signal may be represented by the cross-correlation as follows:

$$r(t) = \sum_{k=1}^{K} \sum_{i=1}^{N} \sqrt{\varepsilon_k}\, b_k(i) s_k(t - iT - \tau_k) + \eta(t) \quad (1)$$

where K is the number of users and N is the size of data block for the multiuser detection. The estimation of the kth user's signal power $\sqrt{\varepsilon_k}$ may be obtained by the parameter estimation block. The source data bits are represented by $b_k(i)$. Here because BPSK modulation is assumed, $b_k(i) \in \{-1, +1\}$. $s_k$ is the signature sequence (spreading code) of the kth user, where T is the duration of one bit. In order to get the best performance, $s_k$ is generated by a pseudo-random number (PN) sequence or Gold code. AWGN is represented by $\eta(t)$.

The first stage of a multiuser detector 424 is always a bank of matched filters 430, which is the sole component of the conventional single user like detector. Each branch of the matched filter bank 430 consists of the correlation of the received signal with one particular user's signature sequence, which is:

$$y_i = \frac{1}{T} \int_0^T r(t) s_i(t)\, dt \quad (2)$$
$$i = 1, 2, \ldots, K$$

Equation (2) can also be expressed in a simple matrix format:

$$y = RAd + \eta \quad (3)$$

where vector y 432 and d are the output of the matched filter bank 430 and the transmitted user bits respectively. There are K elements in each vector. In a general asynchronous system, the scale of matrix R is K×K cross-correlation. The elements in the cross-correlation matrix can be represented by:

$$r_{ij} = \begin{cases} \frac{1}{T} \int_0^T s_i(t) s_j(t)\, dt & i \neq j \\ 0 & i = j \end{cases} \quad (4)$$

In the multistage detector 424 according to the present invention, the auto-correlation is not a factor. A is the amplitude matrix of the signal, which is represented as diag$\{\sqrt{\varepsilon_1}, \sqrt{\varepsilon_2} \ldots \sqrt{\varepsilon_k}\}$. The differencing multistage detector 424 according to the present invention is based on solving linear equation (3).

Figure 5:
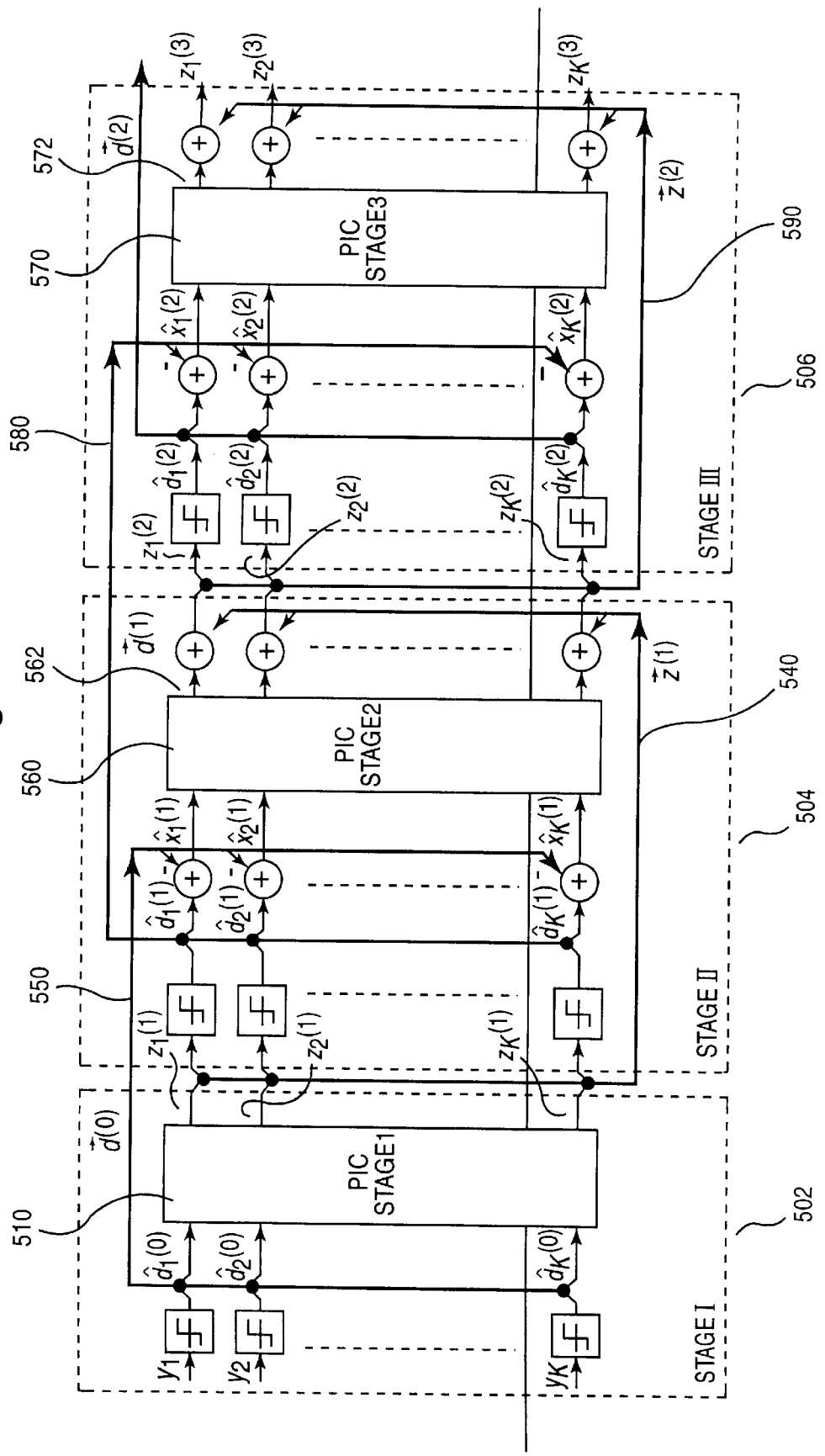
FIG. 5 illustrates the first two stages of differencing multistage detector according to the present invention.

The first three stages 502, 504 of a differencing multistage detector 500 according to one embodiment of the present invention is shown in FIG. 5. Interference cancellation uses the previous estimations to generate a new vector of signals. Then all the "interfering" users are summed and subtracted from previous signal $z^{(1)}$. In the end, a better estimation $\hat{d}^{(l+1)}$ vector is produced.

In each stage of the multistage detector 500, interference cancellation 510, 560, 570 (IC), such as a parallel interference canceller (PIC), removes the intra-cell interference of other users from the received signal to get a better estimated signal for one particular user. Because the exact bit information for any user is unknown, the estimated (hard decision) value in each stage may be used. The output of the lth iteration 540 is:

$$z^{(l)} = y - RA\hat{d}^{(l-1)} \stackrel{def}{=} y - \hat{I}^{(l-1)} \quad (5)$$

$$\hat{d}^{(0)} = \text{sign}(y)$$

$$\hat{d}^{(l-1)} = \text{sign}(z^{(l-1)})$$

The term $\hat{I}$ is defined as the estimated interference provided by the other users to the desired user. Since $\hat{d}_k^{(l)} \in \{-1, +1\}$ and RA is pre-calculated, there are no multiplications in equation (5). After l iterations, it is greatly possible to observe $\hat{d}^{(l)} = \hat{d}^{(l-1)}$. This is the exact property of the convergence. So instead of dealing with each estimated bit vector $\hat{d}^{(l)}$, as before, the difference of the bits in two consecutive stages is calculated, i.e. the input of each stage 550 becomes $\hat{x}^{(l)} = \hat{d}^{(l)} - \hat{d}^{(l-1)}$ (j=1,2, . . . ,K). $\hat{x}^{(l)}$ is called the differencing vector 550. By subtracting two consecutive stages represented by equation (5):

$$z^{(l)} - z^{(l-1)} = -RA\hat{x}^{(l-1)} \quad (6)$$

$$\rightarrow z^{(l)} = z^{(l-1)} - RA\hat{x}^{(l-1)}$$

The updated estimated bit vector $\hat{d}^{(l)}$, can be worked out by $$\hat{d}^{(l)} = \text{sign}(z^{(l)}) \quad (7)$$

Using this differencing technique, many computations are saved by calculating using equation (6) instead of calculating using equation (5), because more and more elements in the vector $\hat{x}^{(l)}$ turn to zero. All the non-zero elements in $\hat{x}^{(l)}$ equal to +2 or −2. Such constant multiplications in equation (6) can be implemented by arithmetic shifts, which will not in actuality introduce any multiplication operations. Further, because subtraction of two consecutive stages is a linear transformation, the bit error rate (BER) after each stage 560/570 will not change, as compared with the conventional multistage detection. This ensures the final BER is the exact same as the conventional multistage detection method.

Accordingly, the complete method for performing multistage detection according to the present invention is as follows:

$$\hat{d}^{(0)} = \text{sign}(y)$$

for k=1 to K $$z_k^{(1)} = y_k - \sum_{j=1, j \neq k}^{j=K} R_{ij} A_j \hat{d}_j^{(0)}$$

end $$\hat{d}^{(1)} = \text{sign}(z^{(1)})$$

for l=1 to L $$\hat{x}^{(l)} = \hat{d}^{(l)} - \hat{d}^{(l-1)}$$

for k=1 to K $$z_k^{(l+1)} = z_k^{(l)} - \sum_{j=1, j \neq k}^{j=K} R_{ij} A_j \hat{x}_j^{(l)}$$

end $$\hat{d}^{(l-1)} = \text{sign}(z^{(l+1)})$$

end

After the first stage 510, the differencing multistage detector 500 starts to use the differencing vector (hard decision feedforward) 550/580 in the input. Furthermore, the decision of the current stage, e.g., 550, is based not only on the current PIC output 562/572, but also on the output 540 of previous PIC stage (i.e., the soft decision from the previous stage.

Figure 6:
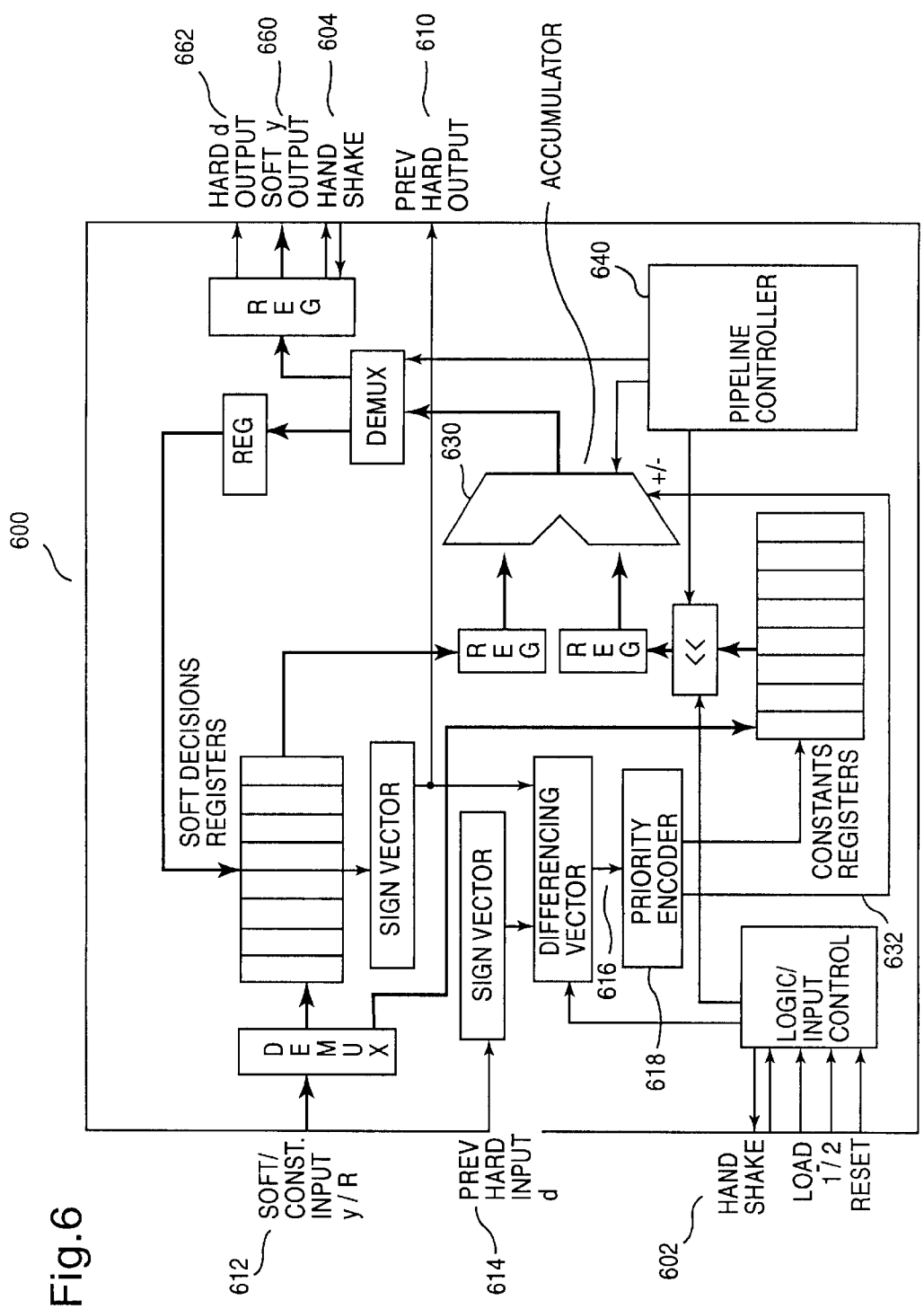
FIG. 6 illustrates a single adder implementation of the differencing multistage detector according to the present invention.

FIG. 6 illustrates a single adder implementation 600 of the differencing multistage detector according to the present invention. If the differencing vector generation and the final shift are not used, the implementation can also be used as the conventional multistage detector. The present invention represented in FIG. 6 is based on an 8-user Gold spreading code system. However, those skilled in the art will readily recognize that the present invention is not meant to be limited to the particular implementation shown in FIG. 6, but that other types of systems and number of users could be accounted for without departing from the scope of the present invention.

The soft decision inputs are parallel in bits for each user and time duplexing for all users. Thus, a parallel to serial converter (not shown) is placed after the matched filter. The timing of these inputs and outputs is controlled by a hand shaking mechanism 602, 604. As soon as the current stage is ready, the previous stage starts transmitting hard output 610 until all the bits are sent, which is indicated by the hand-shaking's signal 604. The input numbers 612 are in two's complement format and they are stored in the data register bank.

At the same time, the hard decisions 614 are obtained from the first bit of the numbers and a differencing vector 616 is generated by combinational logic. A priority encoder 618 will find the non-zero elements in the order of the first come, the highest priority. The timing for the accumulation 630 is scheduled according to the positions of the non-zero elements as directed 632 by the priority encoder 618. If an element is not zero, the accumulator 630 will subtract its corresponding cross-correlation number (which is shift left once if the current stage is the second or later) from all the other user's registers. Loading, shifting, accumulating and writing back are organized as a simple pipeline machine, controlled by a pipelining controller 640. The pipelining controller 640 will not stall because no data and control dependencies exist. Finally the soft 660 and hard 662 decision are generated one by one with certain hand-shaking protocols 604 to the next stage. By passing the differencing vector generation 616 and shift block 650, this device works as the conventional multistage detector.

A major part of the single adder implementation of the differencing multistage detector 600 is devoted to the registers and arithmetic logic unit (ALU). The estimated number of transistors for an eight-user 12-bit fixed point system is 5K. More transistors are thus needed if more than one ALU is implemented in the system.

Based upon hardware simulation, three-stage system delay with the differencing algorithm is less than 100 cycles. Working at the clock rate of 20 MHz, the system delay is about 5 μs, which is much less than that of the conventional multistage detector, i.e., around 12 μs. Further, system throughput is determined by the first stage because it is the slowest block in the system. The multistage detector according to the present invention can reach a throughput up to 200 kb/s with proper buffering. This rate meets 144 kb/s requirement of the Wideband CDMA communications.

Figure 7:
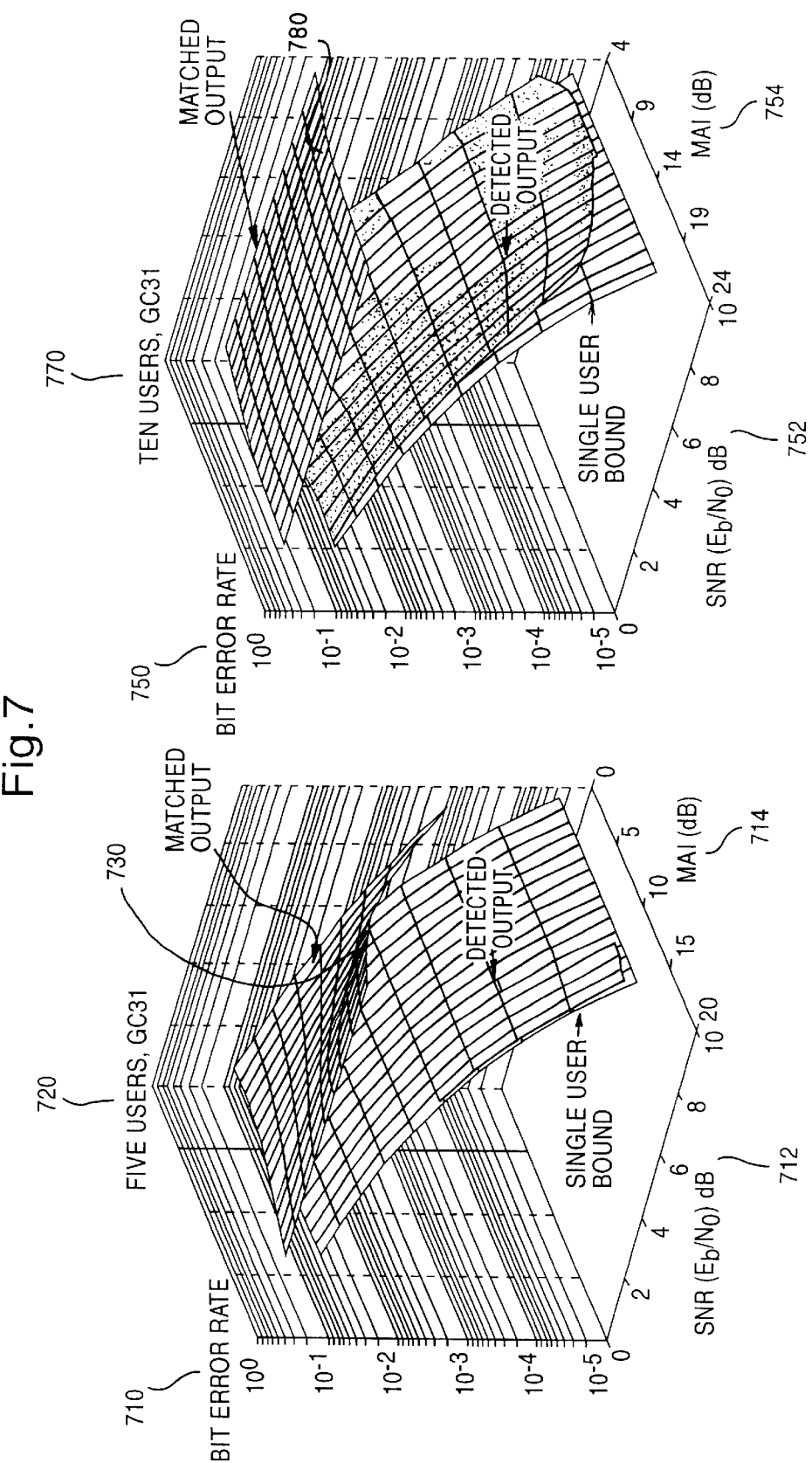
FIG. 7 illustrates the BER versus signal-to-noise ratio (SNR) and MAI in a five-user and ten-user system.

The differencing multistage detector has a bit error rate that is exactly the same as the conventional multistage detector. This is because the framework of the iterative method, nor the convergence speed, is changed. The BER 710, 750 versus signal-to-noise ratio (SNR) and MAI 714, 754 in a five-user 720 and ten-user 770 system is shown in FIG. 7. FIG. 7 shows that the performance of the matched filter degrades 730, 780 dramatically when MAI 714 increases or the number of users increases (720 to 770). On the other hand, the differencing multistage detector performs constantly along with different MAIs. So it can be regarded as a near-far resistant multistage detector. Moreover, its performance approaches a single user communication system BER bound, which is given by $P_e = Q(\sqrt{2E_b/N_0})$ FIG. 8a illustrates an observation 810 of the percentage of zeros 812 in the differencing vector according to the present invention. In FIG. 8a, the percentage of zeros increases as the iterations progresses from 820 to 830. After the fourth stage, the number of zeros gets to the point of 98% in a 15-users communication system. It explicitly indicates that if the conventional multistage detector is used, almost 98% computation resource is wasted.

Figure 8B:
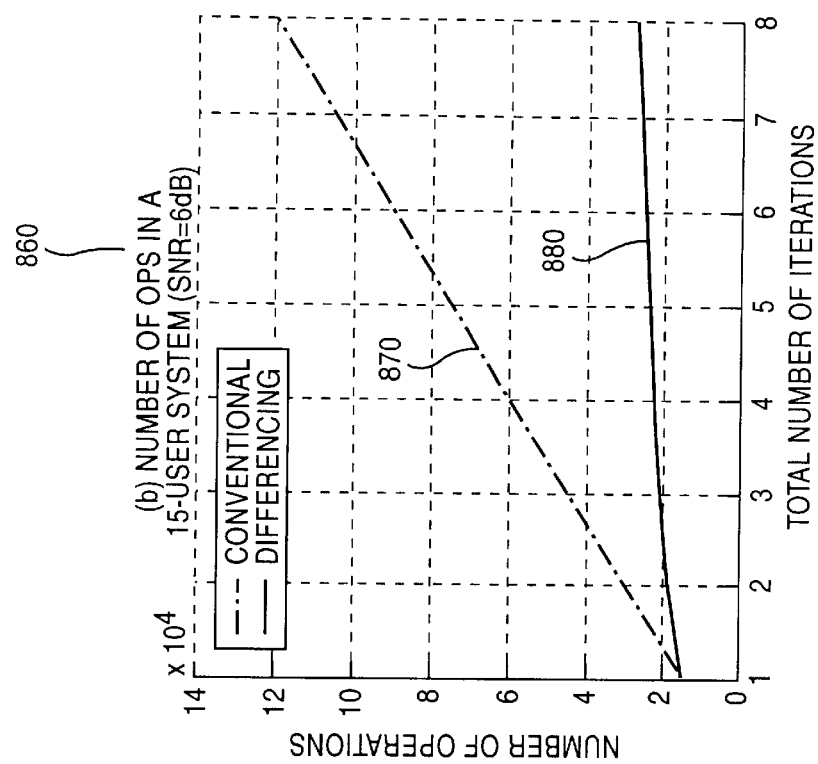
FIG. 8b illustrates the number of computations that are save with a multistage detector according to the present invention.
Figure 8A:
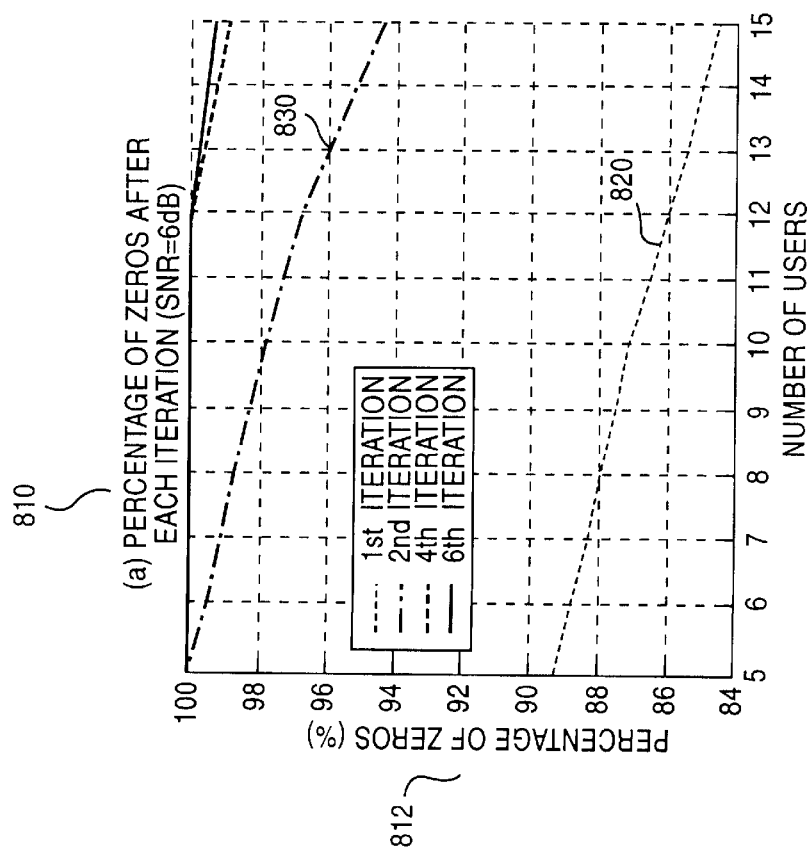
FIG. 8a illustrates an observation of the percentage of zeros in the differencing vector according to the present invention.

FIG. 8b gives a clear view 860 of how many computations we are going to save in a real system. The dotted line 870 represents the accumulated number of operations needed after each stage in the conventional multistage detector. As explained earlier, the number of computations remains constant for each stage, which makes the total floating operations per second (flops) go up linearly. On the contrary, line 880 illustrates that the number of calculations in the differencing multistage detector decreases as the iteration proceeds. Thus, the overall savings can be up to 75% in a five-stage system. And the more stages in the system, the greater the speed of the conventional multistage detector as compared to a conventional multistage detector.

In summary, as compared to the conventional single user detector, the multistage multiuser detector shows a great improvement in the performance in CDMA communications. However, the number of computations in the multistage detector may be greatly reduced by exploiting the convergence of the iterated algorithm. The new differencing multistage detector according to the present invention calculates the difference between two consecutive stages and saves the calculation when the difference becomes zero. This technique shows a great deal of savings in contrast to the basic multistage detector. The hardware implementation of this strategy shows that the bit error rate is the same as the multistage detector, but delay cycles for a five-stage detector will be saved by up to 75%, which meets the requirement of Wideband CDMA communications.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A differencing multistage detector for receiving signals from a plurality of users in a cell of a communications system, the differencing multistage detector reducing the effect of multiple access interference to a signal from a desired user caused by interference from other users in the cell, comprising:

a first stage including a first stage interference canceller for receiving signals from the plurality of users, the first stage interference canceller removing intra-cell interference caused by the other users in the cell and producing a first stage estimated hard decision for each user in the cell;

N subsequent stages, wherein each of the N subsequent stages include a subtractor at the input for subtracting a received hard decision of a previous stage from the estimated hard decision of each user produced in the previous stage to produce a difference signal for each user, the difference signal being provided to an Nth stage interference canceller for removing intra-cell interference caused by the other users in the cell by processing the difference signal for each user to produce an Nth estimated hard decision for each user in the cell;

wherein the interference cancellers produce an estimated hard decision for each user by multiplying the input to the interference cancellers by user cross-correlation values and channel coefficient values, and wherein the difference signal eliminates multiplication operations to be performed by the Nth stage interference canceller.

2. The differencing multistage detector of claim 1 wherein control between stages is handled by a handshaking protocol.

3. The differencing multistage detector of claim 1 wherein the input to each stage is in two's compliment form.

4. The differencing multistage detector of claim 1 wherein each Nth subsequent interference canceller calculates an estimate of multi-user interference by computing a product of a cross-correlation of the received signals and the difference signal.

5. The differencing multistage detector of claim 4 wherein the difference signal comprises 0, +2, or −2.

6. The differencing multistage detector of claim 5 wherein the computing of the product is omitted when the difference signal is 0, and the computing of the product is performed by storing the cross-correlation of the received signals in a register and shifting the bits one place forward when the difference signal is +2 and one place forward with a sign change when the difference is −2.

7. The differencing multistage detector of claim 1 wherein the interference canceller is a parallel interference canceller.

8. A differencing multistage detector for receiving signals from a plurality of users in a cell of a communications system, the differencing multistage detector reducing the effect of multiple access interference to a signal from a desired user caused by interference from other users in the cell, wherein the differencing multistage detector includes a plurality of stages, each stage including an interference canceller for removing intra-cell interference caused by the other users in the cell and producing an estimation output vector, wherein except for a first stage, the estimation output vector of a current stage is based on both a decision of the interference canceller of the current stage and the output from an interference canceller of a previous stage.

9. The differencing multistage detector of claim 8 wherein the estimation output vector of a current stage is produced by combining the output from an interference canceller of a previous stage and the decision of the interference canceller of the current stage.

10. The differencing multistage detector of claim 8 wherein except for the first stage each interference canceller calculates an estimate of multi-user interference by computing a product of a cross-correlation of the received signals and a difference signal.

11. The differencing multistage detector of claim 10 wherein the difference signal comprises 0, +2, or −2.

12. The differencing multistage detector of claim 11 wherein the computing of the product is omitted when the difference signal is 0, and the computing of the product is performed by storing the cross-correlation of the received signals in a register and shifting the bits one place forward when the difference signal is +2 and one place forward with a sign change when the difference is −2.

13. The differencing multistage detector of claim 8 wherein the interference canceller is a parallel interference canceller.

14. The differencing multistage detector of claim 8 wherein control between stages is handled by a handshaking protocol.

15. The differencing multistage detector of claim 8 wherein the input to each stage is in two's compliment form.

16. A base station, comprising
at least one antenna for providing a radio interface to a mobile station; and
at least one transceiver, coupled to the at least one antenna, for processing signals for the mobile station, the transceiver further comprising a transmitter and a receiver, wherein the receiver further comprises:
a differencing multistage detector for receiving signals from a plurality of users in a cell of a communications system, the differencing multistage detector reducing the effect of multiple access interference to a signal from a desired user caused by interference from other users in the cell, wherein the differencing multistage detector includes a plurality of stages, each stage including an interference canceller for removing intra-cell interference caused by the other users in the cell and producing an estimation output vector, wherein except for a first stage, the estimation output vector of a current stage is based on both a decision of the interference canceller of the current stage and the output from an interference canceller of a previous stage.

17. The base station of claim 16 wherein the estimation output vector of a current stage is produced by combining the output from an interference canceller of the previous stage and the decision of the interference canceller of the current stage.

18. The base station of claim 16 wherein except for the first stage each interference canceller calculates an estimate of multi-user interference by computing a product of a cross-correlation of the received signals and a difference signal.

19. The base station of claim 18 wherein the difference signal comprises 0, +2, or −2.

20. The base station of claim 19 wherein the computing of the product is omitted when the difference signal is 0, and the computing of the product is performed by storing the cross-correlation of the received signals in a register and shifting the bits one place forward when the difference signal is +2 and one place forward with a sign change when the difference is −2.

21. The base station of claim 16 wherein the interference canceller is a parallel interference canceller.

22. The base station of claim 16 wherein control between stages is handled by a handshaking protocol.

23. The base station of claim 16 wherein the input to each stage is in two's compliment form.

24. A method for providing differencing multistage detection in the reverse link of a code division multiple access communication system, comprising:
receiving signals from a plurality of users in a cell of the code division multiple access communication system;
processing the received signals through a plurality of stages, each stage including an interference canceller for removing intra-cell interference caused by the other users in the cell; and
producing an estimation output vector for each stage, wherein except for a first stage, the estimation output vector of a current stage is based on both a decision of the interference canceller of the current stage and the output from an interference canceller of a previous stage.

25. The method of claim 24 wherein the producing the estimation output vector of a current stage comprises combining the output from an interference canceller of the previous stage and the decision of the interference canceller of the current stage.

26. The method of claim 24 wherein the producing the estimation vector further comprises calculating except for the first stage an estimate of multi-user interference for each interference canceller by computing a product of a cross-correlation of the received signals and a difference signal.

27. The method of claim 26 wherein the difference signal comprises 0, +2, or −2.

28. The method of claim 27 wherein the computing of the product comprises omitting the computing when the difference signal is 0, and the computing of the product comprises storing the cross-correlation of the received signals in a register and shifting the bits one place forward when the difference signal is +2 and one place forward with a sign change when the difference is −2.

29. The method of claim 24 wherein the interference canceller is a parallel interference canceller.

30. The method of claim 24 further comprises controlling data transfer using a handshaking protocol.

31. The method of claim 24 wherein the input to each stage is in two's compliment form.

* * * * *